Aug. 11, 1953   W. R. BRUCH   2,648,164
FLOWER BOX
Filed May 22, 1950
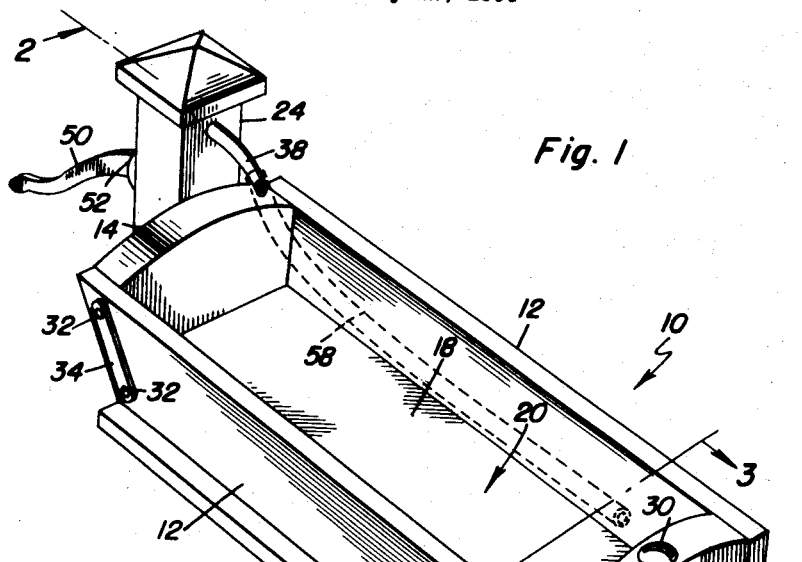
Fig. 1
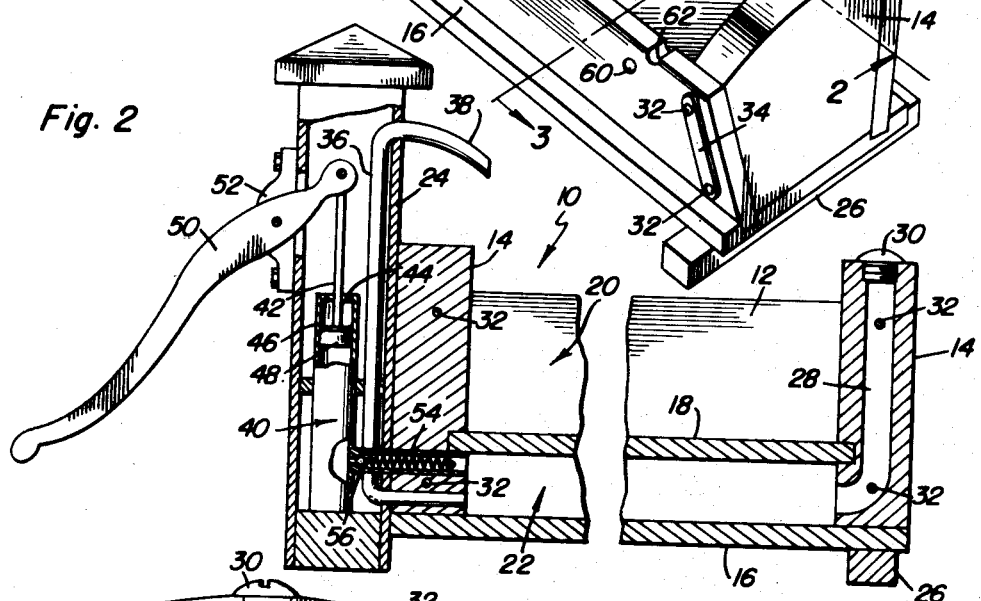
Fig. 2
Fig. 3
Willard R. Bruch
INVENTOR.

Patented Aug. 11, 1953

2,648,164

UNITED STATES PATENT OFFICE 2,648,164

FLOWER BOX

Willard R. Bruch, Yreka, Calif.

Application May 22, 1950, Serial No. 163,557

1 Claim. (Cl. 47—38)

This invention relates to new and useful improvements and structural refinements in flower boxes, and the principal object of the invention is to facilitate convenient and expeditious watering of the plant in the box.

This object is achieved by the provision of what may be called a "built-in" water tank in the bottom of the flower box, an important feature of the invention residing in the provision of pump actuated means for delivering water from the tank to the receptacle in which the soil and plant are contained.

Some of the advantages of the invention reside in its simplicity of construction, in its efficient and expeditious operation, in its pleasing appearance, and in its adaptability to economical manufacture.

With the above more important objects and features in view, and such other objects and features as may become apparent as this specification proceeds, the invention consists essentially of the arrangement and construction of parts as illustrated in the accompanying drawings, in which:

Figure 1 is a perspective view of the invention,

Figure 2 is a vertical sectional view thereof, taken substantially in the plane of the line 2—2 in Figure 1, and Figure 3 is a transverse sectional view, taken substantially in the plane of the line 3—3 in Figure 1.

Like characters of reference are employed to designate like parts in the specification and throughout the several views.

Referring now to the accompanying drawings in detail, the invention consists of a flower box which is designated generally by the reference character 10 and embodies in its construction a horizontally elongated body including a pair of downwardly convergent side walls 12, a pair of end walls 14, a bottom 16 and a "false" bottom 18 which affords in the body a plant and soil receptacle 20 and a hermetically sealed water tank 22 disposed under the receptacle 20, as is best shown in Figures 2 and 3.

A vertically elongated pump housing 24 is secured to one of the end walls 14 and projects below the bottom wall 16 so as to support the entire device in an elevated position, while a transversely extending leg member or bar 26 is provided at the relatively opposite end of the box for the same purpose. The remaining end wall 14 is provided with a passage 28 which is in communication with the water tank 22 and affords a port whereby water may be poured into the tank, the upper or outer end of the passage 28 being equipped with a removable closure plug 30.

If desired, transversely extending tie rods 32, provided at their outer ends with reinforcing straps 34, may pass through the end portions of the side walls 12 and through the end walls 14 for the purpose of securing the same together.

A watering tube 36 extends upwardly from the water tank 22 through the pump housing 24 and terminates at its upper end in a downwardly arcuated spout 38 which is disposed above one end of the receptacle 20, and it is to be noted that the housing 24 also accommodates an air pump assembly which is designated generally by the reference character 40.

This air pump assembly is of the conventional "bicycle" type and includes a reciprocable piston rod 42 extending through a relatively large aperture 44 into the pump housing 46 and carrying at its inner end a collapsibe "cup" piston 48.

The upper or outer end of the piston rod 42 is pivoted to an actuating lever 50 which, in turn, is pivotally mounted between suitable brackets 52 provided on the outside of the housing 24, it being noted that by simply oscillating the handle 50, reciprocation may be imparted to the piston rod 42 and the associated piston 48.

The piston cylinder 46 is provided adjacent its lower end with an outlet port or duct 54 which communicates with the water tank 22 and contains a spring pressed check valve 56, so that when the handle 50 is swung upwardly, the piston cup 48 travels downwardly in the cylinder 46 and expels air through the port or duct 54 into the tank 22. However, since the latter is hermetically sealed, the admission of air under pressure therein will cause the water in the tank to travel upwardly through the tube 36 for discharge into the receptacle 20 through the spout 38 so as to moisten the soil and plants in the receptacle. On the other hand, when the handle 50 is swung downwardly, the piston 48 on its upward stroke will collapse sufficiently to facilitate admission of air from the atmosphere through the opening 44 into the cylinder 46, that is, below the piston 48, in readiness for expulsion into the tank 22 on the subsequent downward stroke of the piston.

A flexible extension hose 58 may be connected to the spout 38 for facilitating watering of remote portions of the receptacle 20, and one of the side walls 12 may be provided with an aperture 60 and a notch 62 to facilitate drainage and overflow, respectively, of excess moisture.

It is believed that the advantages and use of the invention will be clearly understood from the foregoing disclosure and accordingly, further description thereof at this point is deemed unnecessary.

While in the foregoing there has been shown and described the preferred embodiment of this invention, it is to be understood that minor changes in the details of construction and arrangement of parts may be resorted to without departing from the spirit and scope of the invention as claimed.

Having described the invention, what is claimed as new is:

An elongated flower box comprising, a pair of side walls, a pair of end walls, a bottom and a false bottom defining an air-tight water chamber in the lower portion of the box, one of the end walls having a filling duct therein communicating with the chamber, a vertically elongated housing on the other end wall extending below the first named bottom for supporting one end of the box in elevated position, an outlet tube in the housing having one end communicating with the lower portion of the chamber, a spout on the other end of the tube for discharging water into the box, and a pump in the housing communicating with the upper portion of the chamber for forcing air under pressure thereinto for discharging the water therefrom through the tube.

WILLARD R. BRUCH.

References Cited in the file of this patent

UNITED STATES PATENTS

| Number | Name | Date |
| --- | --- | --- |
| 1,230,052 | Stevenson | June 12, 1917 |
| 1,245,381 | Rasmussen et al. | Nov. 6, 1917 |
| 1,363,656 | Jonassen | Dec. 28, 1920 |
| 1,567,142 | Haworth | Dec. 29, 1925 |
| 2,007,479 | Salles et al. | July 9, 1935 |
| 2,051,461 | Lee | Aug. 18, 1936 |
| 2,118,875 | Ellis | Jan. 30, 1940 |
| 2,306,027 | Swaney | Dec. 22, 1942 |